(12) United States Patent
Boonekamp

(10) Patent No.: US 9,632,326 B2
(45) Date of Patent: Apr. 25, 2017

(54) COLLIMATOR COMPRISING A PRISMATIC LAYER STACK, AND LIGHTING UNIT COMPRISING SUCH COLLIMATOR

(75) Inventor: Erik Boonekamp, Utrecht (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 160 days.

(21) Appl. No.: 13/880,219

(22) PCT Filed: Oct. 17, 2011

(86) PCT No.: PCT/IB2011/054579
§ 371 (c)(1),
(2), (4) Date: Apr. 18, 2013

(87) PCT Pub. No.: WO2012/056360
PCT Pub. Date: May 3, 2012

(65) Prior Publication Data
US 2013/0271846 A1    Oct. 17, 2013

(30) Foreign Application Priority Data

Oct. 28, 2010  (EP) .................................. 10189244
Feb. 1, 2011   (EP) .................................. 11152937

(51) Int. Cl.
G02B 27/30    (2006.01)
G02B 5/04     (2006.01)
F21V 8/00     (2006.01)

(52) U.S. Cl.
CPC ............ G02B 27/30 (2013.01); G02B 5/045 (2013.01); G02B 6/0053 (2013.01)

(58) Field of Classification Search
CPC .... G02B 6/0053; G02B 5/045; G02B 6/0036;
G02B 6/0061; G02B 27/0961; G02B 27/0972; G02B 6/003; G02B 6/3528; G02B 27/0955; G02B 6/0031; G02B 6/0046; G02B 6/0016; G02B 6/0058; G02B 6/0076; G02B 6/0011; G02B 6/0043;
(Continued)

(56) References Cited

U.S. PATENT DOCUMENTS 6,091,547 A      7/2000  Gardiner et al.
6,123,431 A *    9/2000  Teragaki et al. ............... 362/625
(Continued)

FOREIGN PATENT DOCUMENTS

EP    1486802 A1    12/2004
EP    1586813 A1    10/2005
(Continued)

*Primary Examiner* — Alicia M Harrington

(57) ABSTRACT

The invention provides a collimator comprising a prismatic layer stack. The prismatic layer stack comprises a first prismatic layer comprising 1D arranged first prisms, with first prism tops having first prism top angels, and first grooves, having first groove angles; and a second prismatic layer comprising 1D arranged second prisms, with second prism tops having second prism top angels, and second grooves, having second groove angles. The first prismatic layer and the second prismatic layer are in a crossed configuration. Further, the first and second prism tops of the first and the second prismatic layers point in the same direction. The first and second prism top angels and the first and second groove angles are selected from the range of 120-160°.

13 Claims, 6 Drawing Sheets

(58) Field of Classification Search
CPC .... G02B 6/005; G02B 27/30; H04N 13/0404; H01S 5/405; G02F 2001/133607; G02F 1/133606; G02F 1/1323; G02F 1/1336; G02F 1/133504

See application file for complete search history.

(56) References Cited

U.S. PATENT DOCUMENTS

| | | |
|---|---|---|
| 7,631,980 B2 | 12/2009 | Holten |
| 7,683,533 B2 | 3/2010 | Kitayama et al. |
| 2003/0035231 A1 | 2/2003 | Epstein et al. |
| 2004/0263039 A1* | 12/2004 | Takei et al. ............. 313/110 |
| 2005/0041311 A1* | 2/2005 | Mi et al. ................. 359/831 |
| 2007/0002586 A1 | 1/2007 | Soh et al. |
| 2008/0049330 A1* | 2/2008 | Tolbert .......... G02F 1/133606 359/599 |
| 2009/0303730 A1 | 12/2009 | Holmberg |

FOREIGN PATENT DOCUMENTS

| | | |
|---|---|---|
| WO | 2008146229 A2 | 12/2008 |
| WO | 2010091888 A1 | 8/2010 |

\* cited by examiner

COLLIMATOR COMPRISING A PRISMATIC LAYER STACK, AND LIGHTING UNIT COMPRISING SUCH COLLIMATOR

FIELD OF THE INVENTION

The invention relates to a collimator comprising a prismatic layer and to a lighting unit comprising a light source and such collimator.

BACKGROUND OF THE INVENTION

Lighting units or luminaires with optically active layers are known in the art. U.S. Pat. No. 7,631,980, for instance, targets at a luminaire comprising a light source and a lighting panel in front of the light source, wherein the outer side (front side) of the lighting panel has a profiled surface in order to direct the transmitted light radiation mainly into a predetermined zone, wherein the light radiation is at relatively small angles to the direction perpendicular to the plane of the lighting panel, and wherein light radiation at small angles to the plane of the lighting panel is reduced, in particular when the luminaire has to produce a relatively high intensity of light radiation in the predetermined zone. To achieve this target, walls of a less translucent material are embedded in the transparent material of the lighting panel, which walls extend substantially perpendicularly to the plane of the lighting panel and preferably extend over the entire thickness of the lighting panel, i.e. over the thickness of the transparent material of the lighting panel. According to U.S. Pat. No. 7,631,980, such walls were found to be an effective means for further reducing inconvenient light radiation from the lighting panel.

Further according to U.S. Pat. No. 7,631,980, it was found that light radiation that leaves the profiled surface at the front of the lighting panel at a relatively small angle to the plane of the lighting panel, which light radiation causes inconvenient glare, and has followed long paths through the material of the lighting panel. Such long paths are possible for certain light rays in the transparent material of the lighting panel, in particular light rays directed at small angles to the plane of the lighting panel. According to U.S. Pat. No. 7,631,980, such light rays appear to be an undesired side effect of the structure of the profiled surface. Such undesired light rays may also be caused by reflection or scattering of light radiation by dust and other particles on the surface of the lighting panel, or by damage or irregularities in the material of the lighting panel.

SUMMARY OF THE INVENTION

Micro Lens Optics (MLO) are used in many light emitting diode (LED) and fluorescent office luminaries to control glare. Although prior art solutions maybe effective in avoiding glare, the use of MLO may have a number of drawbacks:
1. The fabrication process and the cutting of MLO components may be cumbersome;
2. MLO plates may be quite thick (3-4 mm) and heavy and do not allow too much bending;
3. The features in MLO may be quite coarse (±0.5 mm) having a less "advanced look".

Hence, it is an aspect of the invention to provide an alternative collimator and an alternative light source using such collimator, which preferably further at least partly obviate one or more of above-described drawbacks.

The invention proposes optical layers consisting of linear prismatic structures. By placing two layers of this material in a crossed orientation, the intensity distribution obtained may be equal to the existing MLO plates. Said layers may be similar to BEF-layers (Brightness-Enhancement-Films).

In the collimator and the lighting unit of the invention, said layers are very suitable to replace MLO-plates (micro lens optics plate), generally applied in luminaires. Further, such layers may be easier to manufacture than MLO-plates. In addition, the structures (i.e. 1D prisms) may be much smaller than the lenses of MLO systems, like features having sizes <50 micron, which may give a more advanced look than MLO systems with ±0.5 mm features. Further, with the invention, thin and/or flexible collimators may be provided, with may have low or negligible glare.

Therefore, in a first aspect, the invention provides a collimator (i.e. a light collimator) comprising a prismatic layer stack, with the prismatic layer stack comprising:
- a first prismatic layer (such as a sheet, film or foil) comprising 1D arranged first prisms, with first prism tops having first prism top angels, and first grooves, having first groove angles; and
- a second prismatic layer (such as a sheet, film or foil) comprising 1D arranged second prisms, with second prism tops having second prism top angels, and second grooves, having second groove angles;
- wherein the first prismatic layer and the second prismatic layer are in a crossed configuration, the first and second prism tops of the first and the second prismatic layers point in the same direction, and wherein the first and second prism top angles and the first and second groove angles are selected from the range of 120-160°.

With such collimator, light of a light source may efficiently and effectively be collimated and glare may be reduced. Further, the collimator may be thin and may optionally be flexible. The collimator may have a better appearance, since the features (i.e. the prisms) may not be visible. Assuming foil-based systems, the thickness of the collimator may for instance be in the order of 50-200 µm. Instead of foils (flexibility), of course also plates (or sheets) may be used. Then, the thickness of the collimator may for instance be in the order of 2-4 mm.

Here, the term "stack" indicates that the prismatic layers are arranged over each other (are stacked). When using such collimator, a light source will illuminate the first prismatic layer (from the back side, i.e. in a direction to which also the first prisms point), and at least part of the light will be transmitted through the first prismatic layer and illuminate the second prismatic layer (again in a direction to which also the second prisms point), and subsequently at least part of the light transmitted through the first prismatic layer is transmitted through the second prismatic layer, from which at least part may escape as collimated lighting unit light.

As will be clear to a person skilled in the art, the prismatic layers are transmissive. More precisely, the whole stack may be transmissive. Transmissive materials that may be used may for instance be selected from the group consisting from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). As mentioned above, the layers may in an embodiment be similar to BEF-layers (Brightness-Enhancement-Films). Hence, the collimator stack is a transmissive collimator stack.

The first prismatic layer and the second prismatic layer are in a crossed configuration, i.e. the 1D (one dimensional) directions of the prisms of the first prismatic layer and the second prismatic layer have an angle with each other (substantially not being 0° or 180°). In other words, the first prisms have first longitudinal axes and the second prisms have second longitudinal axes, and the first longitudinal axes and the second longitudinal axes each have mutual angles θ unequal zero. Best collimating results may be obtained when the mutual angles θ are in the range of 80-100°, especially 85-95°, even more especially perpendicular to each other. Alternatively, this can be defined as that "crossed" means that the length direction of the grooves of the prismatic sheets mutually extend under an angle θ with each other (which values are as defined above).

As indicated above, the first and second prism tops of the first and the second prismatic layers point in the same direction. Assuming that the stack has a light entrance face, i.e. a face to which light of a light source may be directed, and a light exit face, i.e. the face from which the collimated light may escape from, the bases of the prisms will be substantially parallel to the light entrance face and the prism tops of both prismatic layers point in a direction perpendicular to the entrance face, and in a direction away from the light exit face. When light of a light source is directed to the first prismatic layer (see also below), the main direction or the optical axis of the light will in general be substantially parallel to the direction in which the prisms point. For the sake of clarity, the orientation of the crossed prismatic layer is such that the major faces of the prismatic sheets, i.e. the smooth side and the grooved side, extend mutually parallel.

Viewed in cross section, the prisms have a triangular shape with a prism top angle, and grooves in between with groove angels. The grooves can be seen as virtual prisms.

The prism are elongated and arranged parallel. Hence, herein, the prismatic layers are indicated as ID arranged with prisms. The dimensions and angles of the prisms, prism tops, grooves and groove angles may be different for both prismatic layers. In principle, however, there may even be within one single prismatic layer a variation over the layer of the prism top angles, groove angles and/or dimensions. Preferably however, the angles and dimensions within one prismatic layer are the same over the prismatic layer.

Hence, the stack comprises a first prismatic layer comprising ID arranged first prisms, with first prism tops having first prism top angels, and first grooves, having first groove angles; and (downstream thereof) a second prismatic layer comprising ID arranged second prisms, with second prism tops having second prism top angels, and second grooves, having second groove angles.

As indicated above, the first and second prism top angels and the first and second groove angles are selected from the range of 120-160°. And, also as indicated above, the first and second prism top angels may be selected independently of each other, and the first and second groove angles may be selected independently of each other. In a specific embodiment, the first and second prism top angels are substantially identical in value. In a further specific embodiment, the first and second groove angles are substantially identical in value. Within one prismatic layer, there may be two or more subsets of prisms and/or grooves, which comply with the above condition, but which differ in value of for instance the prism angels and/or groove angles. For instance, there may be a statistical distribution of the angles (within the indicated range(s)).

The angles are for both the grooves and prism tops are thus obtuse. Especially, the prism top angles ($α1$, $α2$) and the groove angles ($β1$, $β2$) are selected from the range of 130-150°. Again, the angles of the grooves and prism tops for the first prismatic layer and second prismatic layer may be selected independently of each other. Due to the nature of the prismatic layer, the prism top angles and groove angels may in an embodiment within one prismatic layer be substantially identical (unless there is a variation over the layer, as indicated above as specific embodiment), for instance both the prism top angle(s) and groove angel(s) being 140° for the first or the second prismatic layer.

In order to further improve a smooth distribution of the light, especially for reducing of intensity variations at wide angles, prismatic parts and right parts may be combined. This is herein indicated as if the prism tops are truncated or as if the grooves are truncated. Truncation of grooves may also be seen as an impression in a layer of prism, where the prism edges of adjacent prisms do not touch each other. This may ensure a more smooth intensity pattern at high angles.

The truncation of the grooves or the prism tops may be introduced in the first prismatic layer or in the second prismatic layer or in both the first and the second prismatic layer. Optionally, both the prism tops and the grooves may be truncated. Hence, below follow a number of variants, which may optionally be combined. Truncation may be for each prism top or groove, respectively, but truncation may also be periodically. Hence, the invention also includes embodiments wherein a subset of prism tops are and a subset of some prism tops are not truncated. Likewise this may apply to grooves.

In a first variant, the first prism tops are truncated having shortest truncated prism top distances ($dt1$) between two adjacent truncated first prism tops, wherein the first prismatic layer has a first prismatic layer pitch ($p1$) (i.e. periodicity), and wherein preferably the first prismatic layer has a ratio of the first prismatic layer pitch ($p1$) and shortest truncated prism top distances ($dt1$) of $1<p1/dt1≤2$. An advantage of applying truncated first prism tops may not only be the improvement of the collimation properties, but such truncation may also be applied to allow the second prismatic layer "rest on" the first prismatic layer. Hence, the second prismatic layer may be in physical contact with the truncated prisms (i.e. with the flat truncated tops) of the first prismatic layer. Within one prismatic layer, there may be two or more subsets of prisms and/or grooves, which comply with the above condition, but which differ in value of for instance the pitch and optionally the truncated prism top distances.

In a second variant, the second prism tops are truncated having shortest truncated prism top distances ($dt2$) between two adjacent truncated second prism tops, wherein the second prismatic layer has a second prismatic layer pitch ($p2$), and wherein preferably the second prismatic layer has a ratio of the second prismatic layer pitch ($p2$) and shortest truncated prism top distances ($dt2$) of $1<p2/dt2≤2$. An advantage of applying truncated second prism tops may not only be the improvement of the collimation properties, but such truncation may also be applied to allow further layers "rest on" the second prismatic layer, i.e. downstream of the second prismatic layer (see also below). Within one prismatic layer, there may be two or more subsets of prisms and/or grooves, which comply with the above condition, but which differ in value of for instance the pitch and optionally the truncated prism top distances.

In a third variant, the first grooves are truncated, wherein the first prisms have base widths ($dg1$) between two adjacent truncated first grooves, wherein the first prismatic layer has a first prismatic layer pitch ($p1$), and wherein preferably the first prismatic layer has a ratio of the first prismatic layer pitch (p1) and base widths (dg1) of $1<p1/dg1\le2$. Within one prismatic layer, there may be two or more subsets of prisms and/or grooves, which comply with the above condition, but which differ in value of for instance the pitch and optionally the base widths.

In a fourth variant, the second grooves are truncated, wherein the second prisms have base widths (dg2) between two adjacent truncated second grooves, wherein the second prismatic layer has a second prismatic layer pitch (p2), and wherein preferably the second prismatic layer has a ratio of the second prismatic layer pitch (p2) and base widths (dg2) of $1<p2/dg2\le2$. Within one prismatic layer, there may be two or more subsets of prisms and/or grooves, which comply with the above condition, but which differ in value of for instance the pitch and optionally the base widths.

Hence, for all variants apply that $1<p/d\le2$. In a non-truncated prismatic layer, the pitch and the top distances/base widths are identical. At values $p/d>2$ the collimating function may decrease. Especially, truncated prism tops or truncated grooves with $1<p/d\le1.5$ are applied. The pitch p and the top distances/base widths are lengths, and may, as further indicated below, for instance be in the range of 5-1000 µm.

In a variant wherein the prism base widths and/or shortest truncated top distances vary, locally the condition of $1<p/d\le2$ may not be met, if in average this condition is however met. Hence, in a specific embodiment, the condition $1<p_a/d_a\le2$ applies, wherein $p_a$ is the average pitch, and wherein $d_a$ is the average prism base width and/or shortest truncated top distance.

Being truncated or not, both the first prismatic layer and the second prismatic layer have a pitch (p). As indicated above, within one prismatic layer, there may be two or more subsets of prisms and/or grooves, which differ in value of for instance the pitch.

As indicated above, the prismatic features may be relatively small, such as in the range of 5-200 µm. Hence, in an embodiment, the first prismatic layer has a first prismatic layer pitch and the second prismatic layer has a second prismatic layer pitch, wherein the first and the second prismatic layer pitches are selected from the range of 5-200 µm. Again, the pitches for both prismatic layers may be chosen independently of each other. However, the features may also be larger, like 5-1000 µm.

In an embodiment, the first prismatic layer and/or the second prismatic layer are obtainable by extrusion. Within one prismatic layer, there may be two or more subsets of prisms and/or grooves, which may differ in prism and/or groove dimensions.

The collimator, or more especially the stack, may further comprise additional (optional) optical elements, such as in the form of (transmissive) layers. For instance, in an embodiment the stack further comprises an optical layer arranged downstream of the second prismatic layer. Such optical layer may for instance be used as exit window and/or as protective layer. When the tops of the second prisms are truncated, such optical layer downstream of the second prismatic layer, may be in physical contact with the truncated prisms (i.e. with the flat truncated tops). Alternatively or additionally, the stack further comprises a diffuser layer arranged upstream of the first prismatic layer. For instance, this optical layer may be used to diffuse the light of an (upstream) light source.

Between the first prismatic layer and the second prismatic layer are at least voids due to the presences of grooves between the (truncated) first prisms. The open space between the first prismatic layer and the second prismatic layer may be filled with gas, such as air.

In a specific embodiment, the collimator comprises a plurality of adjacently arranged prismatic layer stacks. The ID directions may differ from stack to stack. This may allow a further improvement of the smoothness of the light distribution of the collimated light.

In yet a further aspect, the invention provides a lighting unit comprising a light source, configured to provide light source light and the collimator as described herein, configured to collimate the light source light of the light source. The collimator will be arranged downstream of the light source, and the sequence will be (i) light source, downstream thereof (ii) the first prismatic layer and downstream thereof (iii) the second prismatic layer (not excluding other layers upstream, downstream or intermediate).

In a specific embodiment, the lighting unit further comprises a light box, wherein the light box encloses the light source and wherein the light box comprises a light transmissive window, wherein the light transmissive window comprises the collimator. Especially, the light box may enclose a plurality of light sources. The light box may be used to homogenize light and/or homogenize light distribution. The light source can be any light source. However, especially solid state light sources (solid state LEDs) may be of interest, because of their dimensions. Further, the term "light source" may also refer to a plurality of light sources. The collimator may also be used at an outcoupling surface of a waveguide.

The light collimator may especially be configured to suppress radiation escaping from the collimator at an angle larger than 65°. The collimator may thus be used to reduce glare. In an embodiment, the collimator is configured to collimate the light of the lighting unit in such a way that light from the lighting unit at angles (with a normal to the stack) of $\ge65°$ the luminance is $<1000$ cd/m$^2$. Of course this (glare) angle may be chosen to have a different value, dependent upon the application of the lighting unit.

With the present invention, a thin lighting unit may be provided with low or negligible glare. The lighting unit may be applied in for instance an office, a shop, a hospitality area (such as a hotel, a restaurant, a hospital, etc.), etc. For instance, the lighting unit may be applied as embedded unobtrusive light sources (for instance integrated lighting into grid of ceiling).

Herein, the terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

FIGS. 3a-3f show some (comparative) results, further elucidated below.

DETAILED DESCRIPTION OF THE EMBODIMENTS

Figure 1A:
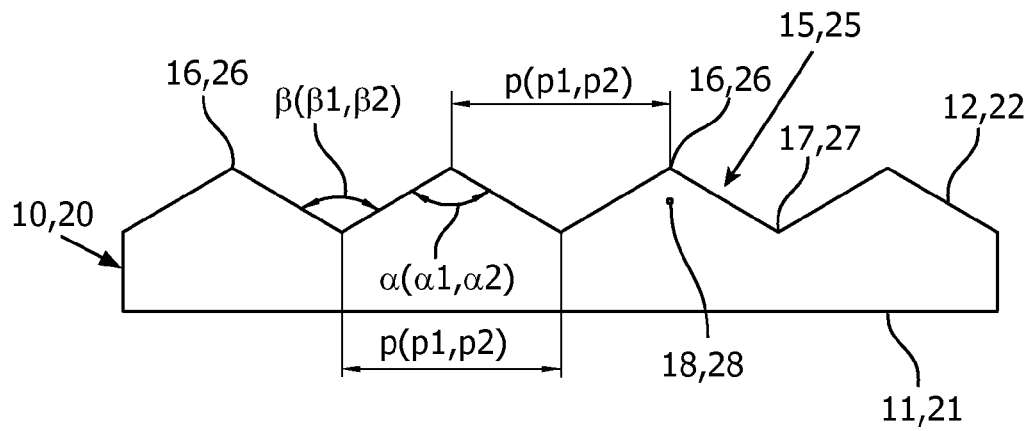
FIGS. 1a-1h schematically depict some embodiments and/or principles of the invention.

FIG. 1a(cross-sectional view) schematically depicts a prismatic layer (or foil). This prismatic layer is an example of first prismatic layer 10 or second prismatic layer 20. Hence, the prismatic layer is indicated with reference 10,20. Likewise, other features are indicated when applicable to both the first and the second prismatic layer.

Assuming it to be a first prismatic layer 10, the first prismatic layer 10 comprises 1D arranged first prisms 15, with first prism tops 16 having first prism top angels $\alpha 1$, and first grooves 17, having first groove angles $\beta 1$.

Assuming it to be a second prismatic layer 20, the second prismatic layer 20 comprising 1D arranged second prisms 25, with second prism tops 26 having second prism top angels $\alpha 2$, and second grooves 27, having second groove angles $\beta 2$.

Note that the value of the prism top angles and groove angles are substantially the same. The angles are obtuse.

The pitch, i.e. the distance between prism tops or grooves is indicated with reference p. The first prismatic layer 10 has a first prismatic layer pitch p1; the second prismatic layer 20 has a second prismatic layer pitch p2. For instance, the first and the second prismatic layer pitches p1,p2 are selected from the range of 5-200 µm.

The prisms have edges 7, which are in fact also the edges of the grooves. The edges 7 of a single prisms 15,25 are configured with respect to each other under the angels $\alpha 1$ and $\alpha 2$, respectively. Likewise, the adjacent edges 7 of two adjacent prisms 15,25 are configured with respect to each other under the angles $\beta 1$ and $\beta 2$, respectively. The (elongated) prisms have a certain direction (longitudinal direction). This can be indicated with longitudinal axes, which have reference(s) 18 for the first longitudinal axes of the first prisms 15 of the first prismatic layer 10, and which have reference(s) 28 for the second longitudinal axes of the second prisms 25. In general, the longitudinal axis within one prismatic layer are all arranged parallel.

The first prismatic foil has a first face 11; the second prismatic foil has a first face 21. Further, the prismatic face or second face of the prismatic foil is indicated with reference 12 and 22, respectively. Light from a light source (not indicated; see below), will travel in a direction from the first face 11,21 to the second face 12,22, and escape therefrom. In general, the first faces 11,21 are smooth. Hence, the major faces (11/12 and 21/22) of the prismatic sheets, i.e. the smooth side and the grooved side, extend mutually parallel, respectively. In general, all major faces 11/12/21/21 extend mutually parallel.

Figure 1B:
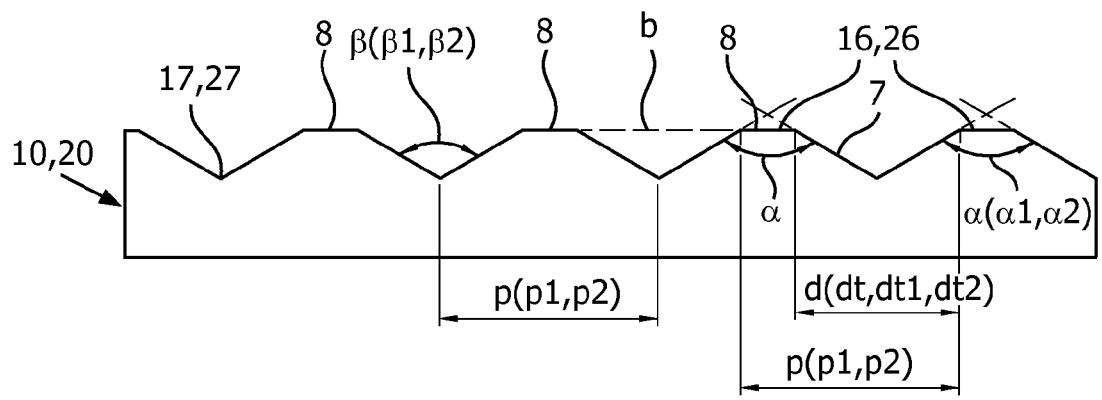
Figure 1C:
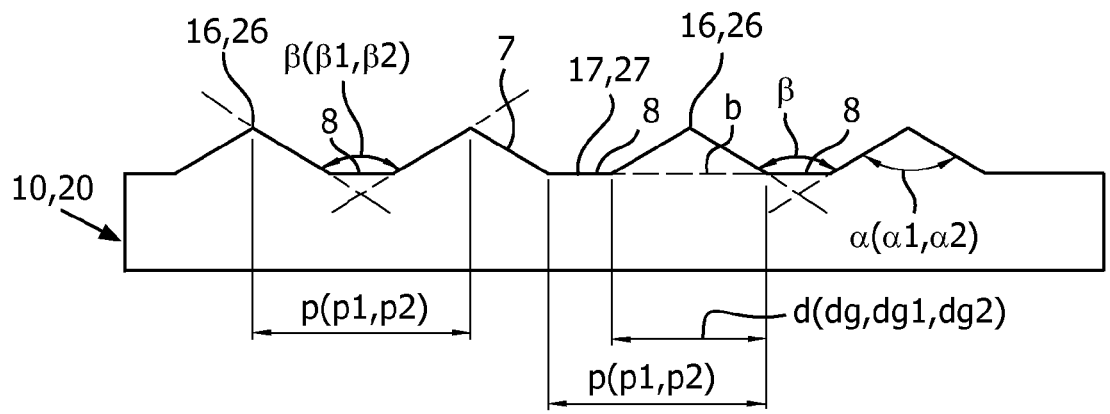

FIGS. 1b-1c schematically depict variants, wherein the prism tops 16,26 and the grooves 17,27, are truncated, respectively. As indicated above, truncation of grooves and/or prism tops may be applied and truncation may be applied for one or both of the prismatic layers.

FIG. 1b schematically depicts an embodiment wherein the prism tops are truncated. Note that when one would virtually extend the edges 7, still the prism top angle a with a value within the indicated ranges would be obtained. Due to the truncation, straight parts 8 are introduced (truncating the prism tops of the prisms). The shortest distance between truncated prism tops is indicated with reference d. In fact, reference d is the length of the (virtual) basis of a virtual prism formed by the groove between two truncated prisms. This is indicated with the dashed line b.

FIG. 1b thus schematically depicts a variant, wherein first prism tops 16 are truncated having shortest truncated prism top distances dt1 between two adjacent truncated first prism tops 16. The first prismatic layer 10 has first prismatic layer pitch p1. Preferably, the first prismatic layer 10 has a ratio of the first prismatic layer pitch p1 and shortest truncated prism top distances dt1 of $1 < p1/dt1 \leq 2$.

Likewise, FIG. 1b schematically depicts a variant, wherein the second prism tops 26 are truncated having shortest truncated prism top distances dt2 between two adjacent truncated second prism tops 26. The second prismatic layer 20 has second prismatic layer pitch p2. Preferably, the second prismatic layer 20 has a ratio of the second prismatic layer pitch p2 and shortest truncated prism top distances dt2 of $1 < p2/dt2 \leq 2$.

As indicated above, this pitch and/or shortest truncated prism top distances may also vary over the prismatic layers. Hence, the condition $1 < p1/dt1 \leq 2$ may also be interpreted in an embodiment as $1 < p1_a/dt1_a \leq 2$ and in another embodiment, the condition $1 < p2/dt2 \leq 2$ may be interpreted as $1 < p2_a/dt2_a \leq 2$, wherein the subscript a indicates that the average value is used.

FIG. 1c schematically depicts similar variants as FIG. 1b, but now with truncated grooves. Note that when one would virtually extend the edges 7, still the groove angle β with a value within the indicated ranges would be obtained. Due to the truncation, straight parts 8 are introduced (truncating the grooves). The thus obtained prism base is indicated with reference d. In fact, reference d is the length of the basis of a prism between two truncated grooves. This is again indicated with the dashed line b.

FIG. 1c thus schematically depicts a variant, wherein the first grooves 17 are truncated, wherein the first prisms 16 have base widths dg1 between two adjacent truncated first grooves 17. The first prismatic layer 10 has first prismatic layer pitch p1. Preferably, the first prismatic layer 10 has a ratio of the first prismatic layer pitch p1 and base widths dg1 of $1 < p1/dg1 \leq 2$.

Likewise, FIG. 1c schematically depicts a variant, wherein the second grooves 27 are truncated, wherein the second prisms 26 have base widths dg2 between two adjacent truncated second grooves 27. The second prismatic layer 20 has second prismatic layer pitch p2. Preferably, the second prismatic layer 20 has a ratio of the second prismatic layer pitch p2 and base widths dg2 of $1 < p2/dg2 \leq 2$.

As indicated above, this pitch and/or shortest truncated prism top distances may also vary over the prismatic layers. Hence, the condition $1 < p2/dt2 \leq 2$ may also be interpreted in an embodiment as $1 < p2_a/dg2_a \leq 2$ and in another embodiment, the condition $1 < p2/dg2 \leq 2$ may be interpreted as $1 < p2_a/dg2_a \leq 2$, wherein the subscript a indicates that the average value is used.

As may be clear from the above, FIGS. 1a-1c schematically depict embodiments and variants that may independently apply to both the first prismatic layer 10 and the second prismatic layer 20. Optionally, when applying truncation, not all prism or grooves are truncated. For instance, truncation may be periodically, for instance n*p, wherein $2 \leq n \leq 10$.

Figure 1D:
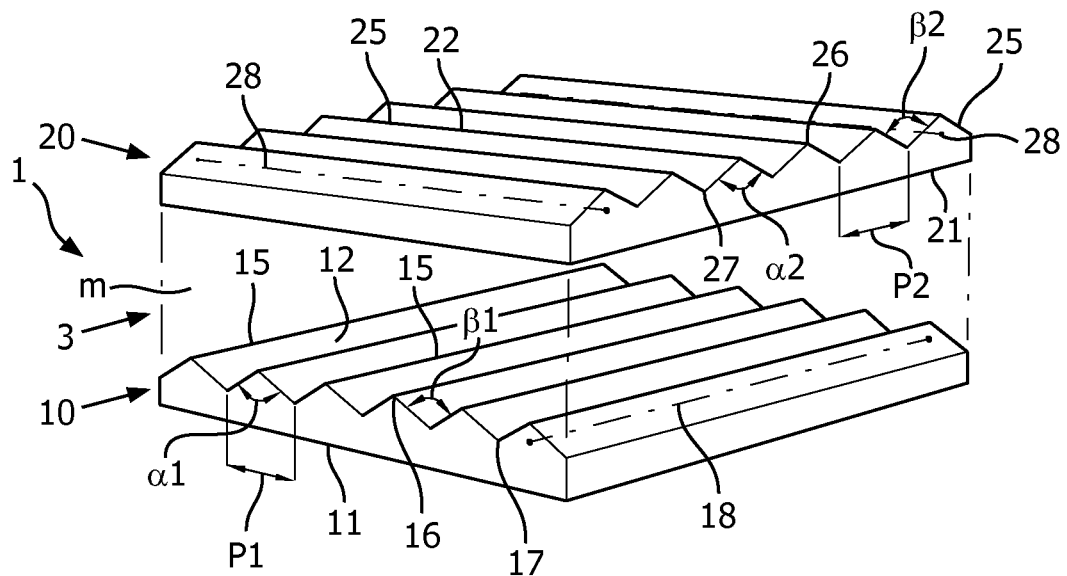

FIG. 1d schematically depicts an embodiment of a collimator 1 comprising a prismatic layer stack 3, with the prismatic layer stack 3 comprising the first prismatic layer 10 and the second prismatic layer 20 (downstream of the first prismatic layer 10, see also below), wherein the first prismatic layer 10 and the second prismatic layer 20 are in a crossed configuration. Note that the first and second prism tops 16,26 of the first and the second prismatic layers 10,20 point in the same direction. In this embodiment, the ID directions are perpendicular to each other (the longitudinal axes 18,28 are perpendicular to each other). Note that all the major faces (11/12 and 12/22) of the prismatic sheets, i.e. the smooth side and the grooved side, extend mutually parallel.

The second face 22 of the first prismatic layer 10 and the first face 21 of the second prismatic layer 20 may be in contact with each other or may be at a distance (as schematically depicted in FIG. 1d). There may be material m between the first and second prismatic layer 10,20, in general air.

This schematic drawing shows non-truncated prism tops 16,26 and grooves 17,27. However, of course the collimator 1 may have truncated prism tops and/or grooves at one or both prismatic layers 10,20 (see also FIG. 1f).

Figure 1E:
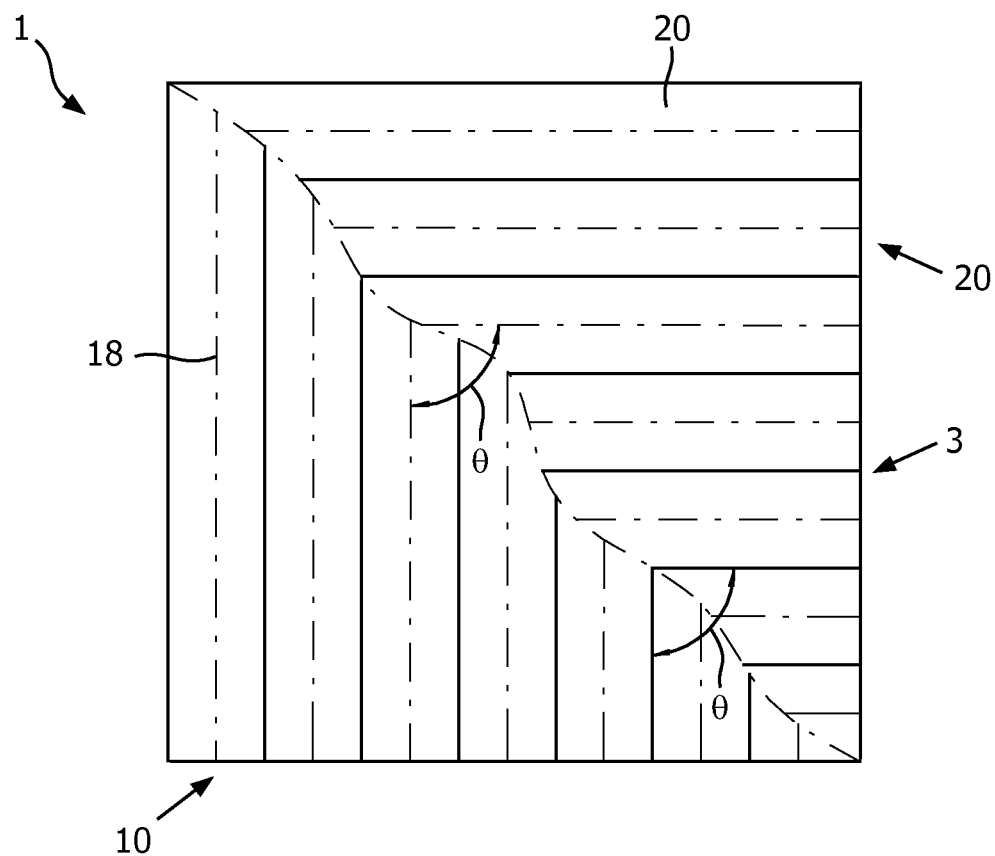

FIG. 1e schematically shows a top view of an embodiment of the collimator 1. The first prisms 15 have first longitudinal axes 18 and the second prisms 25 have second longitudinal axes 28. The first longitudinal axes 18 and the second longitudinal axes 28 each have mutual angles θ in the range of 80°-100°. This of course also implies that they have mutual angles of 180°-80° to 180°-100°. Anyhow, preferably there is no mutual angle larger than 100° (or smaller than 80°).

Figure 1F:
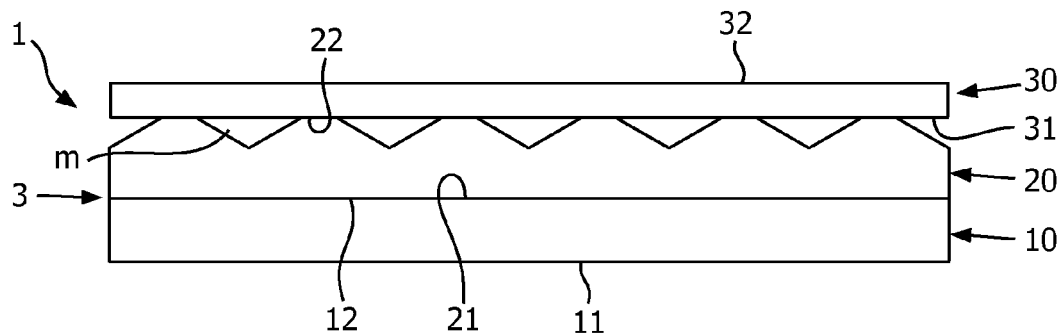

FIG. 1f (cross sectional) schematically depicts an embodiment wherein at least the second prism tops 26 of the second prismatic layer 20 are truncated. The first prismatic layer 1—is of course in crossed arrangement with the second prismatic layer 20. Hence, in this view it cannot be derived whether also the first prism tops 16 or the first grooves 17 would be truncated. Note that the truncation of the second prism tops 26 may have the advantage of less vulnerability of the second prismatic layer and/or the option of easily adding a further optical element to the stack 3. FIG. 1f schematically depicts an embodiment wherein the stack 3 further comprises an optical layer 30 arranged downstream of the second prismatic layer 20, i.e. adjacent or even in physical contact with the second face 22 of the second prismatic layer 20.

Figure 1G:
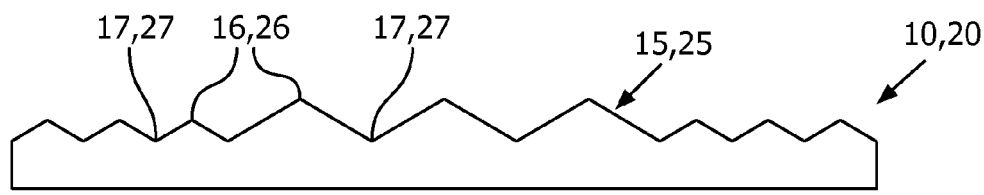
Figure 1H:
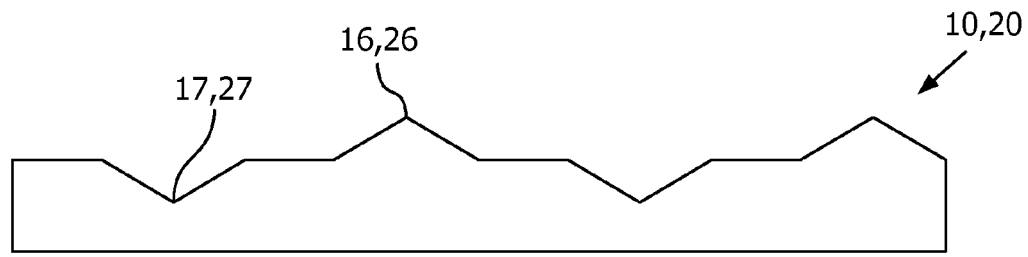

FIG. 1g schematically depicts an embodiment, wherein the pitch is varied over the first and/or second prismatic layers 10,20. FIG. 1h schematically depicts an embodiment wherein the first and/or the second prismatic layers 10,20 have both truncated prism tops 16,26 and grooves 17,27.

Figure 2:
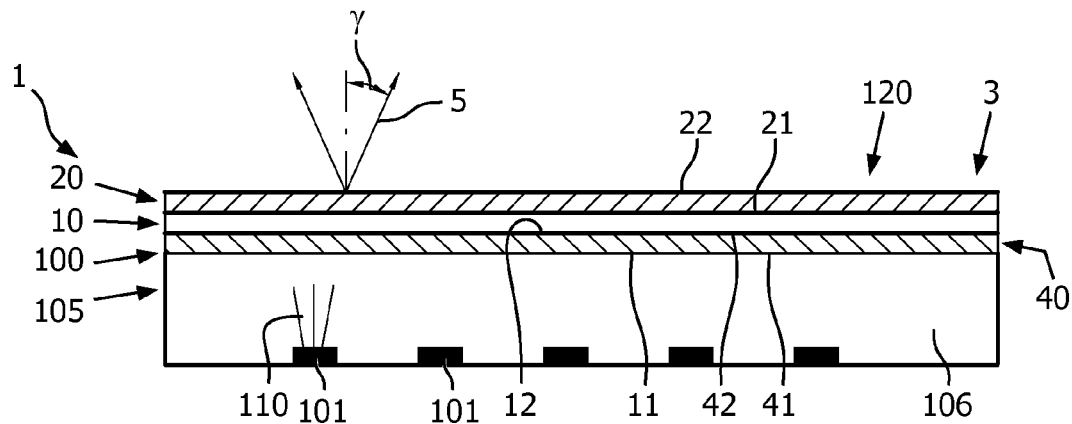
FIG. 2 schematically depicts an embodiment of the lighting unit.

FIG. 2 schematically depicts an embodiment of a lighting unit 100 comprising a light source 101, for instance a LED, configured to provide light source light 110 and an embodiment of the collimator 1 as defined herein, wherein the collimator 1 is configured to collimate the light source light 110. Hence, the collimator 1 is arranged downstream of the light source 101. Second prismatic layer 20 is thus, relative to the light source 101, downstream of the first prismatic layer 10; the first prismatic layer 10 is upstream of the second prismatic layer 20.

Especially, FIG. 2 schematically depicts an embodiment of the lighting unit 100, further comprising a light box 105, wherein the light box 105 encloses the light source 101 (or at least the light emitting part). The light box 105 comprises a light transmissive window 130 comprising the collimator 1. Here, the stack 3 further comprises a diffuser layer 40 arranged upstream of the first prismatic layer 10. References 41 and 42 indicate the first and second face, respectively, of the diffuser layer 40. In this embodiment, the second face 42 of the diffuser plate 40 is adjacent or in physical contact with the first face 11 of the first prismatic layer 10.

The internal of the light box 105, which is indicated with reference 106, can be used to homogenize light of the light source(s) 101. The lighting unit is configured to provide light 5, which is collimated. The main part of the light may be found within a cone having a cone angle γ with a normal to the stack 3. For instance, the main part of the light 5 may be found within a cone angle γ of 65°, thereby substantially reducing glare.

Note that FIG. 2 schematically depicts "normal" prismatic layers. However, other embodiments and variants depicted and/or described above may (independently) be chosen for one or both prismatic layers.

The invention is especially based on optical films consisting of linear prismatic structures. By placing two sheets of this material in a crossed orientation, the intensity distribution obtained may be equal to the existing MLO plates.

Figure 3A:
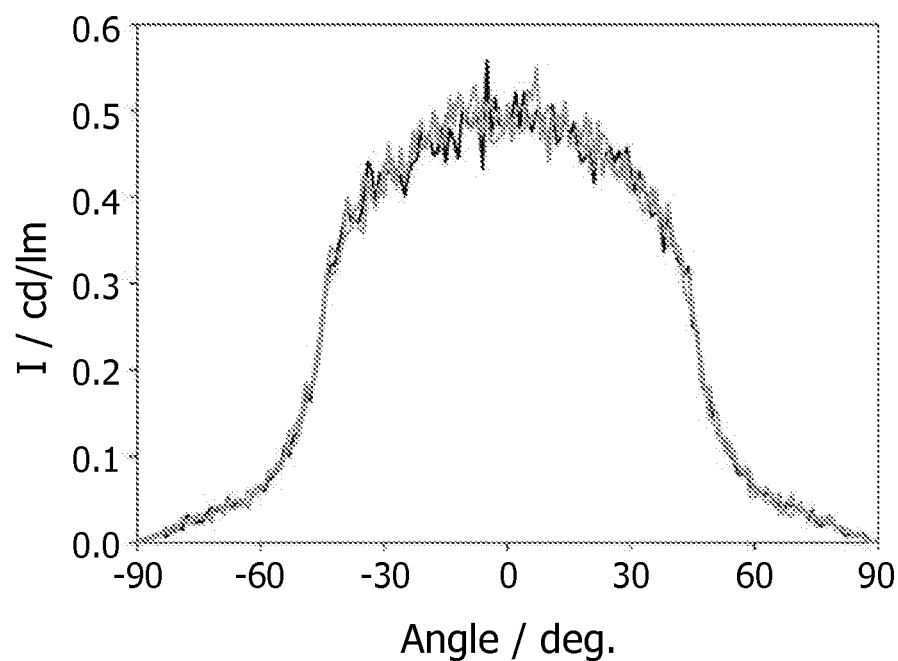
Figure 3B:
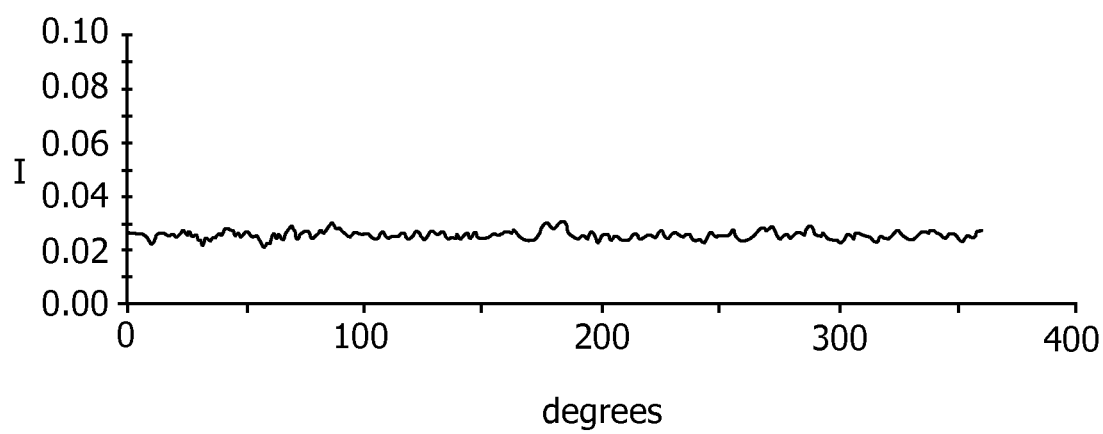

FIG. 3a shows a few intensity cross sections (latitude) of an MLO plate (prior art, apex cone: 108°.). In all directions (longitude) exactly the same profile is obtained. The transmittance of such a plate is 60.4% (single pass, Lambertian source) and a beam width of 91 degrees (FWHM) is obtained. This structure is optimized to give the lowest glare (<1000 cd/m² at 65° is required for office luminaires). Further, a smooth intensity pattern for all hemispherical angles (FIG. 3b).

All simulations were performed using LightTools 7.0.0 ray tracing software from Optical Research Associates (ORA). The MLO and prismatic sheets were simulated in combination with a light box generating diffuse light (large-area Lambertian emitter on the bottom of a light box (efficiency: 100%) having mirror side walls).

In an example, the following is used a film (clear polymer, n=1.50) composed of linear prisms having a top angle of 136 degrees. The optical performance of two crossed films was simulated. On top of the two sheets a clear polycarbonate plate (n=1.60) is placed (protection, support) (see for instance FIG. 2).

Figure 3C:
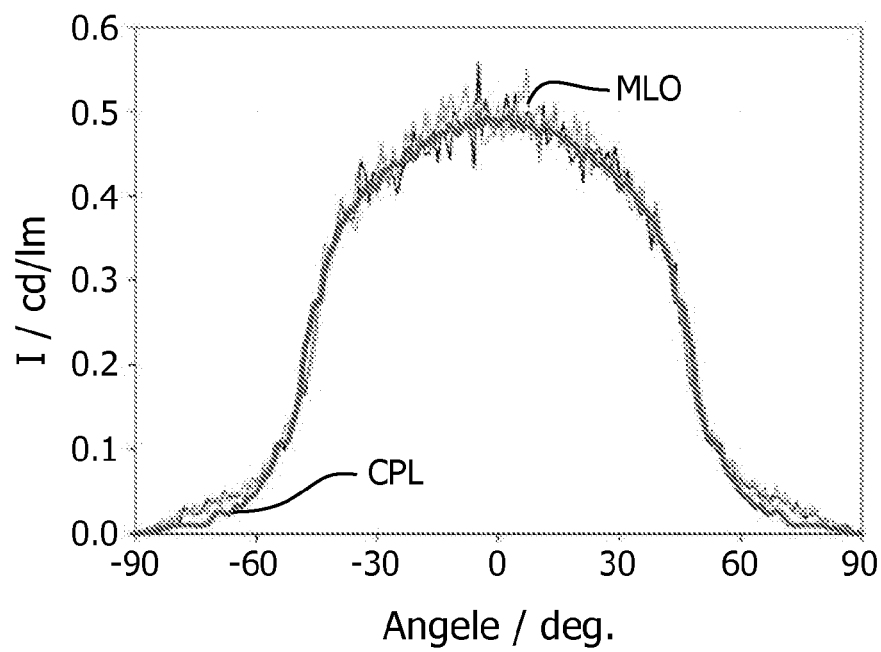

FIG. 3c shows the MLO profile and the new crossed prism solution (averaged over all longitude angles; 0-360°); the latter indicated with CPL (crossed prismatic layers). This intensity profile of the crossed sheets and the MLO plate are equal in the range between 0 and 60 degrees (latitude). The intensities for the "glare angles" (65-90°) are even lower than the conventional MLO structure. Mind also that the top polycarbonate plate helps to decrease the intensity, especially at very high angles (>75°). The transmittance of the layered system is 52.5% and the beam width is 91 deg. FWHM.

Figure 3D:
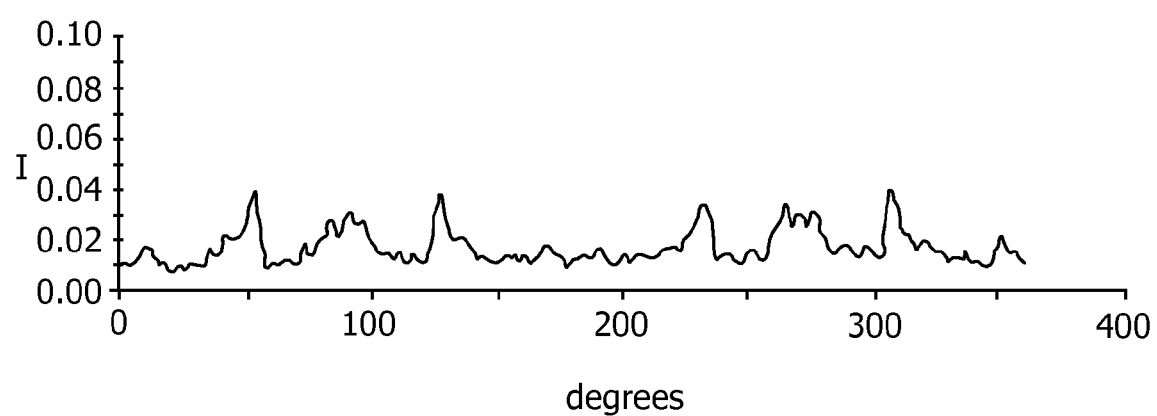

FIG. 3d illustrates the intensity pattern for all hemispherical angles. Remarkable in FIG. 3d is the somewhat irregular intensity pattern at a latitude angles >65° (w.r.t. the normal to the luminaire).

The visual impression of the luminaries at these high angles is important in an office situation. To enhance the visual quality of the fixture at high angles, the optical structure of the film is slightly altered by combining prismatic parts and straight parts in a single film (FIGS. 1b and 1c).

The following parameters where chosen: pitch 1.3; d1, groove and prism top angles 140°, with prism tops truncated. These data apply to both the first and the second prismatic layers 10,20. This may ensures a more smooth intensity pattern at high angles instead of the more peaked pattern in FIG. 3d.

Figure 3E:
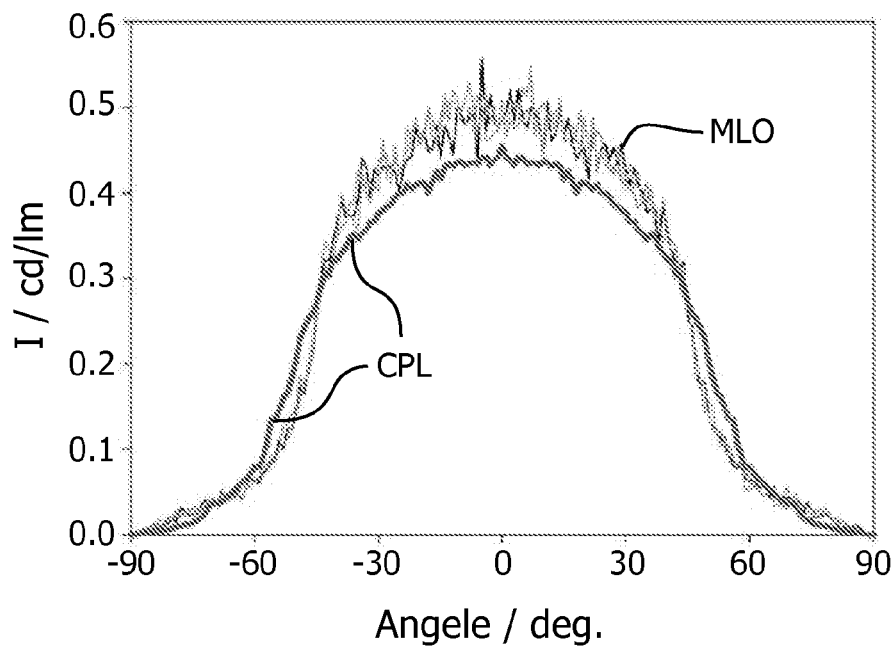
Figure 3F:
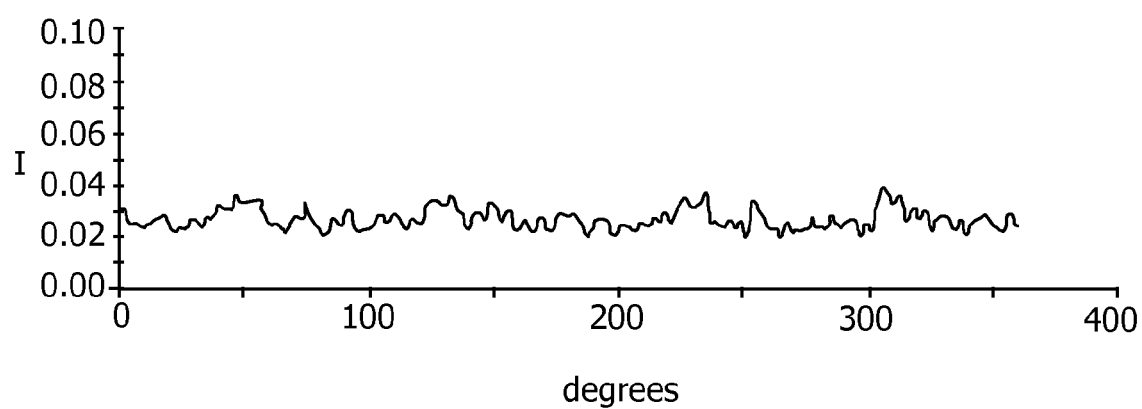

Now, the intensities at latitude angles >65° are still equal or lower than MLO (see FIG. 3e). The transmittance of the crossed structure is 56.6% and the beam width is 100 deg. The wider beam is favorable in spreading the light over a larger area while keeping the glare low (see also FIG. 3f, which is a slice figure with intensity vs. angle).

The layers (or films or plates) can be produced by micro replication or extrusion (high yield, high volume) giving an advantage over MLO. The feature size can for instance be in the range of 10-100 micron giving a very advanced look to the luminaire (larger feature size are of course possible). Sheets can be cut (by a laser) in any desired shape. The prismatic foil can be supported by a thick (2-3 mm) transparent plate (see for instance FIG. 1f). The foils can also be laminated on a transparent plate.

The invention claimed is:

1. A collimator comprising a prismatic film stack, with the prismatic film stack comprising:
    a first flexible prismatic film comprising 1D arranged first prisms with first truncated prism tops having first prism top angles ($\alpha 1$), and first grooves having first groove angles ($\beta 1$); and
    a second flexible prismatic film resting directly on the first truncated prism tops and comprising 1D arranged second prisms, with second prism tops having second prism top angles ($\alpha 2$), and second grooves, having second groove angles ($\beta 2$);
    wherein the first primsatic film and the second prismatic film are in a crossed configuration, the first and second prism tops of the first and the second primatic films point in the same direction, and wherein the first and second prism top angles ($\alpha 1$, $\alpha 2$) and the first and second groove angles ($\beta 1$, $\beta 2$) are selected from the range of 120-160°; and
    wherein at least one of the first and second groove are truncated to form a flat top portion.

2. The collimator according to claim 1, wherein the prism top angles ($\alpha 1$, $\alpha 2$) and the groove angles ($\beta 1$, $\beta 2$) are selected from the range of 130-150°.

3. The collimator according to claim 1, wherein the first truncated prism tops having shortest truncated prism top distances (dt1) between two adjacent truncated first prism tops, wherein the first prismatic film has a first prismatic film pitch (p1), and wherein the first prismatic film has a ratio of the first prismatic film pitch (p1) and shortest truncated prism top distances (dt1) of 1<p1/dt1≤2.

4. The collimator according to claim 1, wherein the second prism tops are truncated and have shortest truncated prism top distances (dt2) between two adjacent truncated second prism tops, wherein the second prismatic film has a second prismatic layer pitch (p2), and wherein the second prismatic film has a ratio of the second prismatic layer pitch (p2) and shortest truncated prism top distances (dt2) of 1<p2/dt2≤2.

5. The collimator according to claim 1, wherein the first grooves are truncated, wherein the first prisms have base widths (dg1) between two adjacent truncated first grooves, wherein the first prismatic film has a first prismatic film pitch (p1), and wherein the first prismatic film has a ratio of the first prismatic film pitch (p1) and base widths (dg1) of 1p1/dt1≤2.

6. The collimator according to claim 1, wherein the second grooves are truncated, wherein the second prisms have base widths (dg2) between two adjacent truncated second grooves, wherein the second prismatic film has a second prismatic layer pitch (p2), and wherein the second prismatic film has a ratio of the second prismatic film pitch (p2) and base widths (dg2) of 1<p2/dg2≤2.

7. The collimator according to claim 1, wherein the stack further comprises an optical layer arranged downstream of the second prismatic film.

8. The collimator according to claim 1, wherein the stack further comprises a diffuser layer arranged upstream of the first prismatic film.

9. The collimator according to claim 1, wherein the first prisms have first longitudinal axes and the second prisms have second longitudinal axes, and wherein the first longitudinal axes and the second longitudinal axes each have mutual angles in the range of 80-100°.

10. The collimator according to claim 1, wherein the first prismatic film has a first prismatic film pitch (p1) and wherein the second prismatic film has a second prismatic film pitch (p2), and wherein the first and the second prismatic film pitches (p1, p2) are selected from the range of 5-1000 µm.

11. The collimator (1) according to claim 10, wherein the first and the second prismatic film pitches (p1, p2) are selected form the range of 5-200 µm.

12. A collimator comprising a prismatic optical layer stack, with the optical layer stack comprising:

a first prismatic layer comprising arranged first prisms, with first truncated prism tops having first prism top angles and first grooves having first groove angles;

a second prismatic layer resting directly on the first truncated prism tops and comprising arranged second prisms, with second prism tops having second prism top angles and second grooves having second groove angles;

the first prismatic layer and the second prismatic layer in a crossed configuration;

the first and second prism tops of the first and the second prismatic layers point in the same direction;

wherein the first and second prism top angles and the first and second groove angles are selected from the range of 120-160°;

wherein the first and second grooves and second prism tops are truncated to form a flat top portion; and wherein each of the first and second prismatic layers is flexible and approximately 50-200 µm thick.

13. A collimator comprising a prismatic optical layer stack, with the optical layer stack comprising:

a first prismatic layer comprising arranged first prisms with first truncated prism tops having first prism top angles and first grooves having first groove angles;

a second prismatic layer resting directly on the first truncated prism tops and comprising arranged second prisms, with second prism tops having second prism top angles and second grooves having second groove angles;

the first prismatic layer and the second prismatic layer in a crossed configuration;

the first and second prism tops of the first and the second prismatic layers point in the same direction;

wherein the first and second prism top angles and the first and second groove angles are selected from the range of 120-160°;

wherein at least one of the first and second grooves are truncated to form a flat top portion; and wherein each of the first and second prismatic layers is flexible and is approximately 50-200 µm thick.

* * * * *